(12) United States Patent
Matsushita et al.

(10) Patent No.: US 12,222,292 B2
(45) Date of Patent: Feb. 11, 2025

(54) OPTICAL SORTER

(71) Applicant: SATAKE CORPORATION, Tokyo (JP)

(72) Inventors: Tadashi Matsushita, Tokyo (JP); Takuya Nishida, Tokyo (JP); Masaaki Sadamaru, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 227 days.

(21) Appl. No.: 18/042,685

(22) PCT Filed: Aug. 23, 2021

(86) PCT No.: PCT/JP2021/030740
§ 371 (c)(1),
(2) Date: Feb. 23, 2023

(87) PCT Pub. No.: WO2022/045047
PCT Pub. Date: Mar. 3, 2022

(65) Prior Publication Data
US 2023/0333025 A1    Oct. 19, 2023

(30) Foreign Application Priority Data
Aug. 26, 2020   (JP) .................................. 2020-142857

(51) Int. Cl.
*G01N 21/85*   (2006.01)
*B07C 5/342*   (2006.01)
(Continued)

(52) U.S. Cl.
CPC .......... *G01N 21/85* (2013.01); *B07C 5/3425* (2013.01); *B07C 5/366* (2013.01);
(Continued)

(58) Field of Classification Search
CPC .......... G01N 21/85; G01N 2021/8416; G01N 2021/8592; G01N 2201/127;
(Continued)

(56) References Cited

U.S. PATENT DOCUMENTS

| 7,339,660 B1 | 3/2008 | Cohn et al. |
| 2008/0024778 A1 | 1/2008 | Honda et al. |

FOREIGN PATENT DOCUMENTS

| JP | S61-212734 A | 9/1986 |
| JP | 5-145833 A | 6/1993 |

(Continued)

OTHER PUBLICATIONS

International Search Report corresponding to International Application No. PCT/JP2021/030740 mailed Nov. 2, 2021, including English translation.

(Continued)

*Primary Examiner* — Md M Rahman
(74) *Attorney, Agent, or Firm* — Renner, Otto, Boisselle & Sklar, LLP (57) ABSTRACT

An optical sorter includes a light source configured to irradiate a sorting target in transit on a conveyance route with light, an optical sensor configured to detect light emitted from the light source and associated with the sorting target, a determination portion configured to determine whether the sorting target is a foreign object and/or a defective product based on a signal acquired by the optical sensor with respect to the light associated with the sorting target, and at least one intermediate member disposed at a position located between the light source and the conveyance route in a direction in which the sorting target is irradiated with the light from the light source and located in such a manner that the intermediate member does not affect the detection of the light associated with the sorting target.

(Continued)

The at least one intermediate member includes a reflection region on which the light emitted from the light source is reflected. The optical sensor is further configured to detect the light emitted from the light source and reflected on the reflection region.

12 Claims, 5 Drawing Sheets

(51) Int. Cl.
*B07C 5/36* (2006.01)
*G01N 21/84* (2006.01)

(52) U.S. Cl.
CPC ............ *G01N 2021/8416* (2013.01); *G01N 2021/8592* (2013.01); *G01N 2201/127* (2013.01)

(58) Field of Classification Search
CPC ......... G01N 21/255; G01N 2021/1765; G01N 2201/0627; B07C 5/3425; B07C 5/366; B07C 5/342

USPC ........................................................ 356/445
See application file for complete search history.

(56) References Cited

FOREIGN PATENT DOCUMENTS

| | | |
|---|---|---|
| JP | 10-54794 A | 2/1998 |
| JP | 2008-2903 A | 1/2008 |
| JP | 2011-88097 A | 5/2011 |
| JP | 2018-59772 A | 4/2018 |
| JP | 2020-91952 A | 6/2020 |
| WO | 2005/038443 A | 4/2005 |

OTHER PUBLICATIONS

Written Opinion corresponding to International Application No. PCT/JP2021/030740 mailed Nov. 10, 2021, Japanese only.
International Preliminary Report on Patentability dated Mar. 9, 2023 for International Application No. PCT/JP2021/030740, with English Translation.

OPTICAL SORTER

This application is a national phase of International Application No. PCT/JP2021/030740 filed Aug. 23, 2021, which claims the priority of Japanese Patent Application JP2020-142857 filed Aug. 26, 2020, all of which are hereby incorporated herein by reference in their entireties.

TECHNICAL FIELD

The present disclosure relates to an optical sorter.

BACKGROUND

Conventionally, there have been known optical sorters (hereinafter simply referred to as sorters) that determine and remove a foreign object and a defective product contained in sorting targets using light information acquired by an optical sensor when the sorting targets are irradiated with light from a light source. The light information acquired by the optical sensor (for example, a color tone value) is compared with a threshold value, and whether the sorting targets are an acceptable product, or a foreign object or a defective product is determined based on a result of this comparison.

In this type of sorter, the light amount of the light source may vary due to an influence of an external temperature, aging deterioration, and/or the like. The variation in the light amount of the light source may cause the deterioration of the determination accuracy (and thus the sorting accuracy) and therefore techniques for compensating for the variation in the light amount have been developed conventionally. For example, in a sorter disclosed in Japanese Patent Application Public Disclosure No. S61-212734, an additional optical sensor (hereinafter referred to as a second optical sensor for convenience) is provided in addition to a sensor that acquires light information regarding a sorting target (hereinafter referred to as a first optical sensor for convenience). Then, when a reduction in the light amount is detected by the second optical sensor, the reduction in the light amount is compensated for. As a result, the determination accuracy can be prevented from being deteriorated due to the reduction in the light amount of the light source. Further, the second optical sensor is disposed at a position where it does not interfere with the acquisition of the light information by the first optical sensor, and therefore this sorter can compensate for the reduction in the light amount in real time during the sorting operation.

SUMMARY

However, the conventional sorters leave room for improvement of the technique for detecting the light amount of the light source. For example, the sorter discussed in Japanese Patent Application Public Disclosure No. S61-212734 necessitates the additional optical sensor, thereby leading to complication of the apparatus configuration and also leading to a cost increase. Such problems are not limited to when the light amount of the light source is detected for the purpose of calibration, and are shared widely among various cases in which the light amount of the light source is detected in the sorter. For example, such problems can also occur when the light amount is detected for the purpose of determining the lifetime of the light source.

The present disclosure has been made to solve at least a part of the above-described problems, and can be realized as, for example, the following configurations.

According to a first aspect of the present disclosure, an optical sorter is provided. The optical sorter includes a light source configured to irradiate a sorting target in transit on a conveyance route with light, an optical sensor configured to detect light emitted from the light source and associated with the sorting target, a determination portion configured to determine whether the sorting target is a foreign object and/or a defective product based on a signal acquired by the optical sensor with respect to the light associated with the sorting target, and at least one intermediate member disposed at a position located between the light source and the conveyance route in a direction in which the sorting target is irradiated with the light from the light source and located in such a manner that the intermediate member does not affect the detection of the light associated with the sorting target. The at least one intermediate member includes a reflection region on which the light emitted from the light source is reflected. The optical sensor is further configured to detect the light emitted from the light source and reflected on the reflection region.

The "light associated with the sorting target" may be reflected light that is light reflected on the sorting target, may be transmitted light that is light transmitted through the sorting target, or may be both of the reflected light and the transmitted light.

According to the optical sorter, the light amount of the light source can be detected by detecting the light emitted from the light source and reflected on the reflection region of the at least one intermediate member by the optical sensor. Further, the at least one intermediate member is disposed at the position where it does not affect the detection of the light associated with the sorting target by the optical sensor, and therefore the light amount of the light source can be detected in real time during the sorting operation of the optical sorter. In addition, the optical sensor can be used in common for the detection of the light associated with the sorting target and the detection of the light reflected on the reflection region, and therefore no additional optical sensor should be provided only to detect the light mount of the light source.

According to a second aspect of the present disclosure, in the first aspect, the light source includes a first light source disposed on a first side with respect to the conveyance route of the sorting target, and a second light source disposed on a second side opposite from the first side. The optical sensor includes at least one of a first optical sensor disposed on the first side and a second optical sensor disposed on the second side. The at least one intermediate member is optically non-transmissive, and substantially prevents the light from reaching the optical sensor by being transmitted through the at least one intermediate member from one side where the conveyance route is located. According to this aspect, in the case where the optical sensor includes the first optical sensor, the at least one intermediate member is disposed on the first side, and the light emitted from the second light source located on the second side does not reach the first optical sensor located on the first side by being transmitted through the at least one intermediate member. Therefore, when the light emitted from the first light source and reflected on the reflection region is detected by the first optical sensor, the light emitted from the second light source is not detected by the first optical sensor together with this reflected light. Therefore, the light amount of the first light source can be correctly detected without being affected by the light emitted from the second light source. Similarly, in the case where the optical sensor includes the second optical sensor, the at least one intermediate member is disposed on the second side, and the light emitted from the first light source located on the first side does not reach the second optical sensor located on the second side by being transmitted through the at least one intermediate member. Therefore, the light amount of the second light source can be correctly detected without being affected by the light emitted from the first light source.

According to a third aspect of the present disclosure, in the first or second aspect, the optical sorter further includes a transparent member separating the light source and the optical sensor, and the conveyance route. The at least one intermediate member is in the form of a sheet member adherable to the transparent member. According to this aspect, the apparatus configuration can be simplified. Further, the present aspect can also make the manufacturing easy and reduce the manufacturing cost.

According to a fourth aspect of the present disclosure, in the third aspect, the at least one intermediate member is disposed opposite of the transparent member from the conveyance route. According to this aspect, the at least one intermediate member is not affected by dust generated along with the conveyance of the sorting target.

According to a fifth aspect of the present disclosure, in any of the first to fourth aspects, the optical sensor is a line sensor or an area sensor including a plurality of linearly arranged light receiving elements. The at least one intermediate member is disposed on both sides of the conveyance route in an arrangement direction that is a direction in which the plurality of light receiving elements is arranged. According to this aspect, the light amount of the first light source can be detected on the both sides of the conveyance route in the first arrangement direction. Therefore, the present aspect allows the local tendency of the light amount of the first light source to be easily understood. For example, when the light amount of the light source is normal on one side in the first arrangement direction and the light amount of the light source is abnormal on the other side, the abnormality on the other side can be correctly detected.

According to a sixth aspect of the present disclosure, in any of the first to fifth aspects, the optical sorter further includes a calibration portion configured to conduct calibration based on a result of the detection by the optical sensor with respect to the light reflected on the reflection region. According to this aspect, a variation in the light amount of the light source can be excellently compensated for in real time during the sorting operation of the optical sorter. Especially, combination of the sixth aspect and the second aspect allows further accurate calibration to be achieved based on the correctly detected light amount of the light source. Further, in the case where the optical sensor includes both the first optical sensor and the second optical sensor, the establishment of balance can be pursued between the light amount of the first light source and the light amount of the second light source.

According to a seventh aspect of the present disclosure, in the sixth aspect, the calibration includes adjusting the light amount of the light source based on the result of the detection. According to this aspect, the variation in the light amount of the light source can be compensated for without amplifying noise.

According to an eighth aspect of the present disclosure, in the sixth or seventh aspect, the calibration includes adjusting, based on the result of the detection, a gain regarding the signal acquired by the optical sensor. According to this aspect, the variation in the light amount of the light source can be compensated for regardless of the performance of adjusting the light amount of the light source.

According to a ninth aspect of the present disclosure, in any of the first to eighth aspects, the optical sorter further includes a notification portion configured to issue a notification indicating an abnormality in a case where the light amount of the light source is determined, based on the result of the detection by the optical sensor with respect to the light reflected on the reflection region, not to fall within a first range bounded based on a first threshold value and a second threshold value greater than the first threshold value. According to this aspect, the notification indicating the abnormality in the light amount of the light source can be issued in real time during the sorting operation of the optical sorter. Therefore, a user can notice the abnormality in the light amount of the light source at an early stage. As a result thereof, the present aspect prevents the deterioration of the sorting accuracy due to continuation of the sorting operation of the optical sorter despite the occurrence of the abnormality in the light source.

According to a tenth aspect of the present disclosure, in the ninth aspect including the sixth aspect, the calibration portion is configured to conduct the calibration in a case where the light amount of the light source is determined, based on the result of the detection, to fall within the first range but not to fall within a second range bounded based on a third threshold value greater than the first threshold value and a fourth threshold value greater than the third threshold value and smaller than the second threshold value. According to this aspect, the optical sorter can be configured to conduct the calibration if a degree of the variation in the light amount of the light source is such a degree that the determination accuracy can be appropriately ensured by the calibration (this is set as a second range), and to issue the notification indicating the abnormality if the degree of the variation is such a degree that the determination accuracy cannot be appropriately ensured by the calibration (this is set as a first range). In sum, a proper measure can be taken according to the degree of the variation in the light amount of the light source.

According to an eleventh aspect of the present disclosure, in any of the first to tenth aspects, the light source includes a plurality of light emitting element groups each of which includes a plurality of light emitting elements electrically connected in series. According to this aspect, when one light emitting element becomes unable to light up due to a failure, deterioration, or the like, the plurality of light emitting elements in the light emitting element group to which this one light emitting element belongs is turned off all together. Therefore, the light amount considerably varies when one light emitting element becomes unable to light up. Therefore, the state that the lighting is impossible can be readily detected. As a result thereof, the user can be prevented from causing the deterioration of the sorting accuracy by continuing the operation of the optical sorter without noticing the state that the lighting is impossible.

According to a twelfth aspect of the present disclosure, in the eleventh aspect including the fifth aspect, the plurality of light emitting element groups consists of a first light emitting element group and a second light emitting element group. The first light emitting element group is disposed on one side in the arrangement direction, and the second light emitting element group is disposed on an opposite side in the arrangement direction. According to this aspect, the plurality of light emitting elements of the light source is divided into two groups arranged in the arrangement direction, and the at least one intermediate member is disposed so as to allow the light amount of each of the groups to be detected. Therefore, the state that the lightning is impossible can be reliably detected.

According to one aspect of the present disclosure, the at least one intermediate member includes a low-reflection region that substantially does not reflect the light. The optical sensor is further configured to detect light in the low-reflection region. A result of the detection of the light in the low-reflection region may be used to make an offset correction or a gain correction of a result of the detection of the light reflected on the reflection region by the optical sensor. According to this aspect, the light amount of the light source can be further correctly detected. The low-reflection region can be, for example, a region where a total reflectance is 10% or lower.

According to one aspect of the present disclosure, the calibration portion repeatedly conducts the calibration during the sorting operation of the optical sorter. According to this aspect, even when a variation occurs in the light amount of the light source during the sorting operation, this variation can be compensated for in real time.

According to one aspect of the present disclosure, the calibration portion conducts the calibration only during the sorting operation of the optical sorter. The optical sorter includes a light source controller configured to reduce the light amount of the light source while the sorting operation of the optical sorter is stopped compared to during the sorting operation. According to this aspect, the optical sorter can excellently conduct the calibration while pursuing a reduction in power consumption and the prevention of the deterioration of the light source.

According to one aspect of the present invention, the optical sensor is a line sensor or an area sensor including a plurality of linearly arranged light receiving elements. The at least one intermediate member is disposed at a position that does not overlap the conveyance route as viewed in any direction perpendicular to the direction in which the plurality of light receiving elements is arranged. The plurality of light receiving elements includes a light receiving element that detects the light associated with the sorting target in transit but does not detect the light reflected on the reflection region, and a light receiving element that does not detect the light associated with the sorting target in transit but detects the light reflected on the reflection region.

According to one aspect of the present disclosure, the at least one intermediate member may include a black layer located on one side where the conveyance route is located and a white layer located on the other side opposite from the conveyance route. The white layer forms the reflection region.

DETAILED DESCRIPTION OF THE EMBODIMENTS

Figure 1:
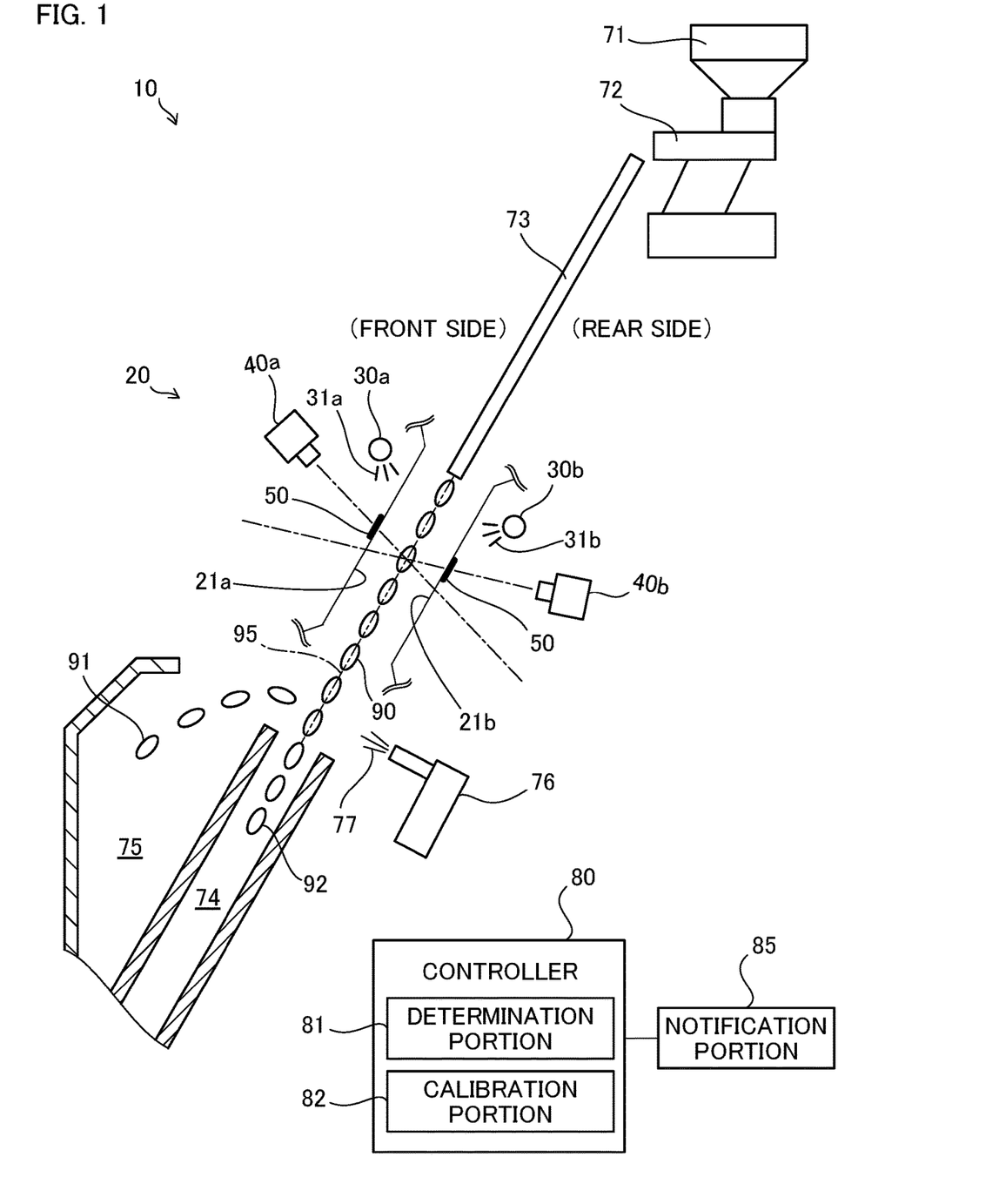
FIG. 1 is a schematic view illustrating the outline of the configuration of an optical sorter according to one embodiment of the present disclosure.

FIG. 1 is a schematic view illustrating the outline of the configuration of an optical sorter (hereinafter simply referred to as a sorter) 10 according to one embodiment of the present disclosure. In the present embodiment, the sorter 10 is used to sort a foreign object (for example, a small stone, mud, and a glass piece) and a defective product (for example, an immature grain and a colored grain) from a rice grain (more specifically, brown rice or milled rice) set as a sorting target 90. However, the sorting target 90 is not limited to brown rice or milled rice, and may be any granular object. The sorting target 90 may be, for example, unhulled rice, a wheat grain, beans (a soybean, a chickpea, a green soybean, or the like), resin (a pellet or the like), a rubber piece, or the like.

As illustrated in FIG. 1, the sorter 10 includes an optical detection unit 20, a storage tank 71, a feeder 72, a chute 73, an acceptable product discharge gutter 74, a defective product discharge gutter 75, an ejector 76, and a controller 80. The controller 80 controls the overall operation of the sorter 10. The controller 80 also functions as a determination portion 81 and a calibration portion 82. The functions of the controller 80 may be realized by a CPU executing a predetermined program, may be realized by a dedicated circuit, or may be realized by a combination of them. The determination portion 81 and the calibration portion 82 may be realized by a single integrated device. For example, the determination portion 81 and the calibration portion 82 may be two functions realized by a single CPU. Alternatively, the determination portion 81 and the calibration portion 82 may be realized as individual different devices. The details of the functions of the controller 80 will be described below.

The storage tank 71 temporarily stores the sorting target 90 therein. The feeder 72 feeds the sorting target 90 stored in the storage tank 71 onto the chute 73 serving as one example of a sorting target conveyance means. The optical detection unit 20 irradiates the sorting target 90 sliding down from the chute 73 with light, and detects light associated with the sorting target 90 (more specifically, transmitted light transmitted through the sorting target 90 and reflected light reflected on the sorting target 90). An output from the optical detection unit 20, i.e., an analog signal indicating a detected light intensity is amplified with a predetermined gain and is further converted into a digital signal by an AC/DC converter (not illustrated). This digital signal (i.e., a tone value corresponding to the analog signal) is input to the controller 80. The controller 80 determines, based on the input light detection result (i.e., an image), whether the sorting target 90 is an acceptable product (i.e., a relatively high-quality rice grain), or a foreign object (i.e., something that is not a rice grain) or a defective product (i.e., a relatively low-quality rice grain), as processing by the determination portion 81. This determination is made with respect to each sorting target 90. Any known determination method can be employed for this determination. Typically, this determination is made by comparing the tone value of the image data and a predetermined threshold value.

If the sorting target 90 is determined to be a foreign object or a defective product, the ejector 76 ejects air 77 toward this sorting target 90. As a result, the sorting target 90 is blown off, and is deviated from a falling trajectory from the chute 73 and guided to the defective product discharge gutter 75 (indicated as a sorting target 91 in FIG. 1). On the other hand, if the sorting target 90 is determined to be an acceptable product, the air 77 is not ejected. Therefore, the sorting target 90 determined to be an acceptable product is guided to the acceptable product discharge gutter 74 without changing the falling trajectory thereof (indicated as a sorting target 92 in FIG. 1).

In the following description, the details of the functions of the optical detection unit 20 and the controller 80 will be described. As illustrated in FIG. 1, the optical detection unit 20 includes a first light source 30a, a first optical sensor 40a, a second light source 30b, and a second optical sensor 40b. The first light source 30a and the first optical sensor 40a are disposed on one side (also referred to as a front side) with respect to a conveyance route 95 of the sorting target 90 (i.e., the falling trajectory from the chute 73). The second light source 30b and the second optical sensor 40b are disposed on the other side (also referred to as a rear side) with respect to the conveyance route 95 of the sorting target 90. The "front side" may be regarded as one example of a "first side" recited in the claims, and the "rear side" may be regarded as one example of a "second side" recited in the claims. Conversely, the "front side" may be regarded as one example of the "second side" recited in the claims, and the "rear side" may be regarded as one example of the "first side" recited in the claims.

The first light source 30a irradiates the sorting target 90 that is being conveyed on the conveyance route 95 (i.e., is falling from the chute 73) with light 31a. Similarly, the second light source 30b irradiates the sorting target 90 that is being conveyed with light 31b. The first light source 30a is a light source unit with a plurality of light emitting elements 32a mounted on a single board. In the present embodiment, LEDs are used as the light emitting elements 32a. Therefore, the light emitting elements 32a will also be referred to as LEDs 32a. The plurality of LEDs 32a includes an LED that emits red light, an LED that emits blue light, and an LED that emits green light. The second light source 30b is configured similarly to the first light source 30a, and includes a plurality of LEDs 32b.

FIG. 1 illustrates the first light source 30a and the second light source 30b assuming that the number of light sources is one for each of them, but the number of light sources may be plural for at least one of the first light source 30a and the second light source 30b. For example, two first light sources 30a may be disposed on the upper side and the lower side with respect to a detection position on the conveyance route 95, respectively. Similarly, two second light sources 30b may be disposed on the upper side and the lower side with respect to the detection position on the conveyance route 95, respectively.

The first optical sensor 40a and the second optical sensor 40b detect the light emitted from the first light source 30a and the second light source 30b and associated with the sorting target 90. More specifically, the first optical sensor 40a on the front side can detect the light 31a emitted from the first light source 30a on the front side and reflected on the sorting target 90 and the light 31b emitted from the second light source 30b on the rear side and transmitted through the sorting target 90. The second optical sensor 40b on the rear side can detect the light 31b emitted from the second light source 30b on the rear side and reflected on the sorting target 90 and the light 31a emitted from the first light source 30a on the front side and transmitted through the sorting target 90.

In the present embodiment, the first optical sensor 40a is a line sensor including a plurality of linearly arranged light receiving elements 41a. However, the first optical sensor 40a may be an area sensor. The direction in which the plurality of light receiving elements 41a is arranged will also be referred to as an arrangement direction D1. The arrangement direction D1 is also the width direction of the chute 73 (i.e., a direction perpendicular to a falling direction on a slide surface of the chute 73). Further, the first optical sensor 40a is a color CCD sensor in the present embodiment, and can detect red light, green light, and blue light individually separately. However, the first optical sensor 40a may be another type of sensor, such as color CMOS sensor. The second optical sensor 40b is configured similarly to the first optical sensor 40a, and includes a plurality of light receiving elements 41b arranged in the arrangement direction D1.

The optical detection unit 20 further includes transparent members 21a and 21b. The transparent member 21a separates the first light source 30a and the first optical sensor 40a, and the conveyance route 95 on the front side. Due to this configuration, the first light source 30a and the first optical sensor 40a, and the conveyance route 95 are isolated from each other, and dust scattering from the conveyance route 95 can be prevented from being attached to the first light source 30a and the first optical sensor 40a. Similarly, the transparent member 21b separates the second light source 30b and the second optical sensor 40b, and the conveyance route 95 on the rear side.

The optical detection unit 20 further includes an intermediate member 50 on each of the front side and the rear side. The intermediate member 50 on the front side is disposed at a position between the first light source 30a and the conveyance route 95 in a direction in which the sorting target 90 is irradiated with the light 31a from the first light source 30a. The intermediate member 50 on the rear side is disposed at a position between the second light source 30b and the conveyance route 95 in a direction in which the sorting target 90 is irradiated with the light 31b from the second light source 30b.

Figure 2:
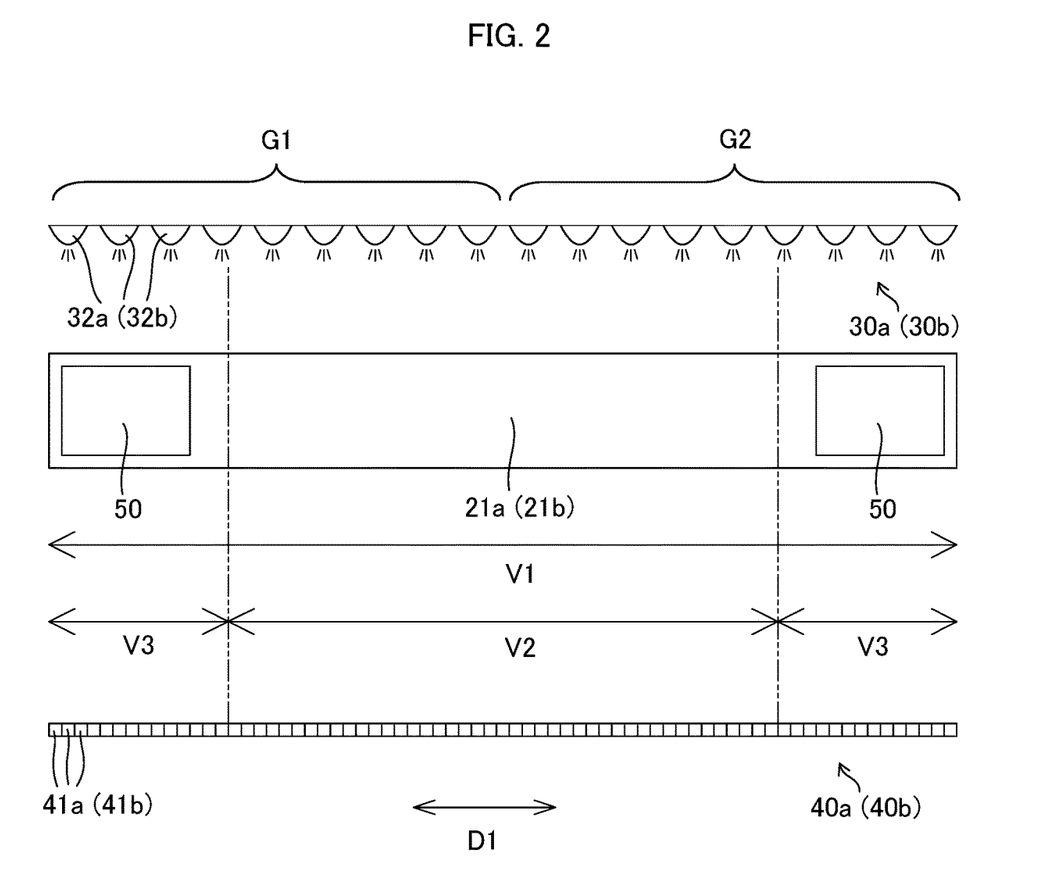
FIG. 2 is a schematic view illustrating the positional relationship between a light source, an intermediate member, and an optical sensor.

FIG. 2 is a schematic view illustrating the positional relationship between the first light source 30a and the second light source 30b, the intermediate member 50, and the first optical sensor 40a and the second optical sensor 40b in the arrangement direction D1. The illustrated positional relationship is similar between the front side and the rear side, and therefore will be described below mainly focusing on the front side. As illustrated in FIG. 2, on the front side, the plurality of light emitting elements 32a (18 light emitting elements 32a in the illustrated example) is arranged in the arrangement direction D1 in which the plurality of light receiving elements 41a of the first optical sensor 40a is arranged.

Figure 4:
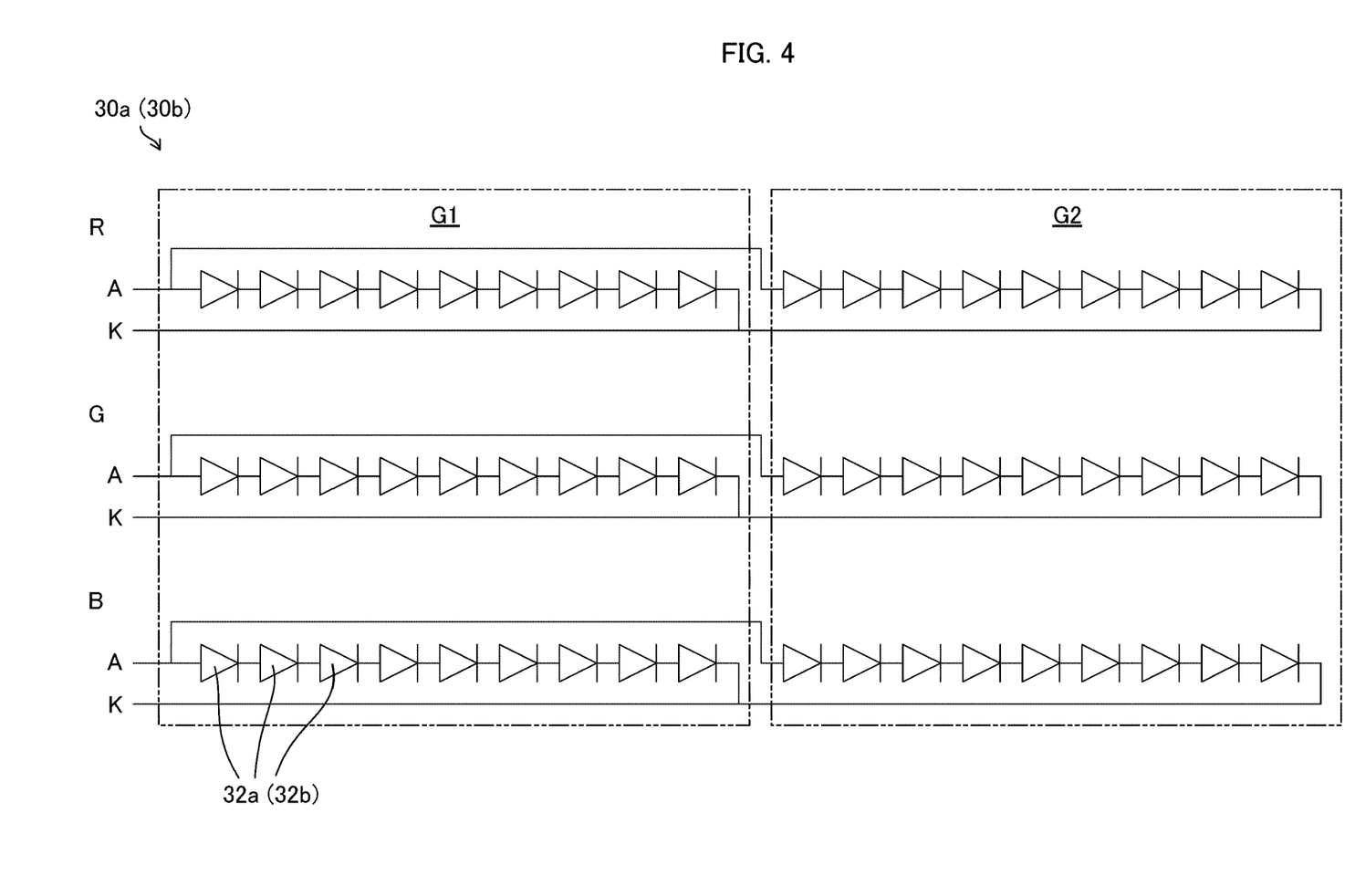
FIG. 4 illustrates the connection configuration of light emitting elements of the light source.

FIG. 4 illustrates the connection configuration of the light emitting elements 32a and 32b for each color component in the first light source 30a and the second light source 30b. The connection configuration is similar between the first light source 30a and the second light source 30b, and therefore will be described below only focusing on the first light source 30a. As illustrated in FIG. 4, the plurality of light emitting elements 32a that emits red light (indicated as "R" in FIG. 4) is divided into a first light emitting element group G1 and a second light emitting element group G2. In the first light emitting element group G1, a plurality of light emitting elements 32a (9 light emitting elements 32a in the illustrated example) is connected electrically in series. Similarly, in the second light emitting element group G2, a plurality of light emitting elements 32a (9 light emitting elements 32a in the illustrated example) is connected electrically in series. The plurality of light emitting elements 32a that emits green light (indicated as "G" in FIG. 4) and the plurality of light emitting elements 32a that emits blue light (indicated as "B" in FIG. 4) also have connection configurations similar to the plurality of light emitting elements 32a that emits red light.

As illustrated in FIG. 2, the first light emitting element group G1 is disposed on one side in the arrangement direction D1, and the second light emitting element group G2 is disposed on the other side in the arrangement direction D1. In FIG. 2, "V1" illustrated therein represents a total field of view of the first optical sensor 40a in the arrangement direction D1. Further, "V2" illustrated in FIG. 2 represents a material field of view, i.e., a range where the sorting target 90 can be imaged. The width of the material field of view V2 is equivalent to the width of the chute 73 (i.e., the width of the conveyance route 95). The plurality of light receiving elements 41a is arranged so as to extend to outside the material field of view V2 in the arrangement direction D1. Due to this configuration, a non-material field of view V3 of the first optical sensor 40a is secured on each of the both sides of the material field of view V2 in the arrangement direction D1.

The intermediate member 50 is disposed on a region corresponding to the non-material field of view V3 in the transparent member 21a. In other words, the intermediate member 50 is disposed at a position where it does not affect the detection of the light associated with the sorting target 90 by the first optical sensor 40a. This position is, i.e., a position that does not overlap the conveyance route 95 as viewed in any direction perpendicular to the arrangement direction D1. In the present embodiment, the intermediate member 50 is disposed on each of the both sides of the conveyance route 95 in the arrangement direction D1.

The intermediate member 50 on the front side reflects the light 31a emitted from the first light source 30a on the front side. The light 31a reflected on the intermediate member 50 is detected by the first optical sensor 40a (more specifically, the light receiving elements 41a corresponding to the non-material field of view V3). The intermediate member 50 is located outside the boundary between the material field of view V2 and the non-material field of view V3 in the arrangement direction D1, and therefore the reflected light on the intermediate member 50 is not detected by the light receiving elements 41a corresponding to the material field of view V2. Conversely, the light associated with the sorting target 90 is not detected by the light receiving elements 41a corresponding to the non-material field of view V3. Similarly, the intermediate member 50 on the rear side reflects the light 31b emitted from the second light source 30b on the rear side. The light 31b reflected on the intermediate member 50 is detected by the second optical sensor 40b (more specifically, the light receiving elements 41b corresponding to the non-material field of view V3).

As clearly understood from this description, the first optical sensor 40a is used in common for the detection of the light associated with the sorting target 90 and the detection of the light 31a reflected on the intermediate member 50. Similarly, the second optical sensor 40b is used in common for the detection of the light associated with the sorting target 90 and the detection of the light 31b reflected on the intermediate member 50.

In the present embodiment, the intermediate member 50 is in the form of a sheet member adherable to the transparent member 21a or 21b. In other words, the intermediate member 50 is a sheet member having an adhesive on one surface thereof. Therefore, the present embodiment can simplify the apparatus configuration of the sorter 10. Further, the present embodiment can make the manufacturing easy and reduce the manufacturing cost. However, the intermediate member 50 can be realized in any form. For example, the intermediate member 50 may be a plate member. In this case, the intermediate member 50 may be disposed so as to be spaced apart from the transparent member 21a or 21b.

Figure 3:
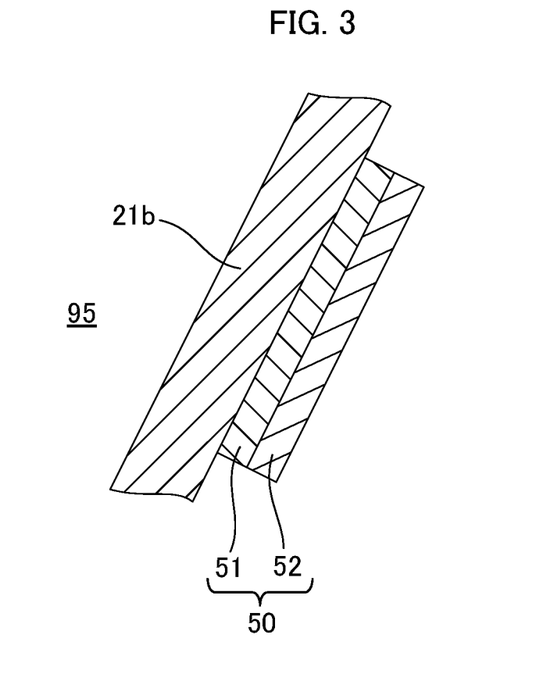
FIG. 3 is a cross-sectional view of the intermediate member.

FIG. 3 is a cross-sectional view of the intermediate member 50. FIG. 3 illustrates the intermediate member 50 attached to the transparent member 21b. As illustrated in FIG. 3, the intermediate member 50 has a two-layered structure. More specifically, the intermediate member 50 includes a first layer 51 located on the side closer to conveyance route 95 and a second layer 52 located opposite from the conveyance route 95. The first layer 51 is optically non-transmissive. The first layer 51 is black in the present embodiment. However, the color of the first layer 51 is not especially limited, and may be, for example, blue or brown. The material and the thickness of the first layer 51 can be set in any manner as long as the first layer 51 is optically non-transmissive. The first layer 51 of the intermediate member 50 on the front side substantially prevents the light 31b emitted from the second light source 30b on the rear side from reaching the first optical sensor 40a by being transmitted through the intermediate member 50 from the side closer to the conveyance route 95. The first layer 51 of the intermediate member 50 on the rear side substantially prevents the light 31a emitted from the first light source 30a on the front side from reaching the second optical sensor 40b by being transmitted through the intermediate member 50 from the side closer to the conveyance route 95.

The second layer 52 is made from an optically reflective material. The second layer 52 may be, for example, opaque and white. The second layer 52 of the intermediate member 50 on the front side reflects the light 31a emitted from the first light source 30a, and the second layer 52 of the intermediate member 50 on the rear side reflects the light 31b emitted from the second light source 30b.

In the present embodiment, the intermediate member 50 is disposed opposite of the transparent member 21a or 21b from the conveyance route 95 as illustrated in FIG. 3. Therefore, the intermediate member 50 is unaffected by the dust generated along with the conveyance of the sorting target 90. In addition, the exposed surface of the first layer 51 (i.e., the surface opposite from the second layer 52) serves as an adhered surface of the intermediate member 50 for adhering to the transparent member 21a or 21b, and the exposed surface of the second layer 52 (i.e., the reflection surface that reflects the light 31b) has no adhesive thereon. This can eliminate the possibility that the adhesive impairs the reflective performance of the second layer 52. However, the intermediate member 50 may be disposed on the side closer to the conveyance route 95 with respect to the transparent member 21a or 21b. Even in this case, the reflection surface of the second layer 52 is supposed to adhere to the transparent member 21a or 21b, thereby being unaffected by the dust.

According to the above-described sorter 10, the light amounts of the first light source 30a and the second light source 30b can be detected by detecting the light beams 31a and 31b emitted from the first light source 30a and the second light source 30b and reflected on the intermediate members 50 (more specifically, the second layers 52) by the first optical sensor 40a and the second optical sensor 40b, respectively. The intermediate members 50 are disposed at the positions where they do not affect the detection of the light associated with the sorting target 90, and therefore allow the light amounts of the first light source 30a and the second light source 30b to be detected in real time during the sorting operation of the sorter 10. In addition, no additional optical sensor is required to detect the light amounts of the first light source 30*a* and the second light source 30*b*.

Further, according to the sorter 10, the first layer 51 of the intermediate member 50 on the front side substantially prevents the light 31*b* emitted from the second light source 30*b* on the rear side from reaching the first optical sensor 40*a* by being transmitted through the intermediate member 50 from the side closer to the conveyance route 95. Therefore, in the non-material field of view V3, the light 31*b* emitted from the second light source 30*b* on the rear side is not detected by the first optical sensor 40*a* together with the light 31*a* when the light 31*a* emitted from the first light source 30*a* on the front side and reflected on the intermediate member 50 is detected by the first optical sensor 40*a* on the front side. Therefore, the light amount of the first light source 30*a* can be correctly detected without being affected by the light 31*b* emitted from the second light source 30*b*. Similarly, the light amount of the second light source 30*b* can be correctly detected without being affected by the light 31*a* emitted from the first light source 30*a*. In other words, even when a variation occurs in the light amount of only one of the first light source 30*a* and the second light source 30*b*, the light amount of the first light source 30*a* and the light amount of the second light source 30*b* can be separately correctly detected.

Further, according to the sorter 10, the light amounts of the first light source 30*a* and the second light source 30*b* are detected using the intermediate members 50 on the both sides of the conveyance route 95 in the arrangement direction D1. Therefore, the local tendencies of the light amounts of the first light source 30*a* and the second light source 30*b* can be easily understood compared to when the light amounts are detected only on one side. For example, when an abnormality has occurred in the light amount only on one side in the arrangement direction D1, this abnormality can be readily detected.

The above-described sorter 10 can further conduct calibration and notification based on the light amounts of the first light source 30*a* and the second light source 30*b* detected using the intermediate members 50. Now, the configuration thereof will be described. In the present embodiment, the calibration is repeatedly conducted by the calibration portion 82 of the controller 80 during the sorting operation of the sorter 10. More specifically, the calibration portion 82 first acquires the light amount of each of the first light source 30*a* and the second light source 30*b* acquired using the intermediate members 50 in the above-described manner. This light amount is acquired for each of RGB color components. Further, this light amount is acquired with respect to each of the one side and the other side in the arrangement direction D1. In other words, the light amount of the first light emitting element group G1 located on the one side and the light amount of the second light emitting element group G2 located on the other side in the arrangement direction D1 are acquired separately. The acquired light amount may be a statistical value (for example, an average value or a median value) of the result of the detection by the plurality of light receiving elements 41*a* or light receiving elements 41*b* corresponding to the non-material field of view V3.

Next, the calibration portion 82 determines whether the acquired light amount falls within a first range. The first range may be preset for each of the RGB color components. The first range is a range bounded based on a first threshold value TH1 and a second threshold value TH2, and a reference value indicating an ideal light amount is contained in the first range. For example, the first threshold value TH1 may be set to a value of −30% of the reference value, and the second threshold value TH2 may be set to a value of +30% of the reference value.

If there is a color component having a light amount falling outside the first range with respect to at least one of the first light emitting element group G1 and the second light emitting element group G2 as a result of the determination, the controller 80 notifies a user of the abnormality in the light amount via a notification portion 85. The notification portion 85 may be in the form of a screen of control panel of the sorter 10, a speaker, a light, and/or the like. In other words, the notification can be issued in the form of a display on the screen, a warning sound, lighting-up of the light, and/or the like. According to this configuration, the notification indicating the abnormality in the light amount of the first light source 30*a* or the second light source 30*b* can be issued in real time during the sorting operation of the sorter 10. Therefore, the user can notice the abnormality in the light amount of the first light source 30*a* or the second light source 30*b* at an early stage. As a result thereof, the present configuration prevents the deterioration of the sorting accuracy due to continuation of the sorting operation of the sorter 10 despite the occurrence of the abnormality in the light source.

Especially, according to the connection configuration illustrated in FIG. 4, when one light emitting element 32*a* becomes unable to light up due to a failure, deterioration, or the like, the plurality of light emitting elements 32*a* in the light emitting element group G1 or G2 to which this one light emitting element 32*a* belongs is turned off all together. Therefore, the light amount considerably varies when one light emitting element 32*a* becomes unable to light up. Therefore, the state that the lighting is impossible can be readily detected, and the notification can be issued via the notification portion 85. Further, the present configuration eliminates the necessity of providing a circuit dedicated for detecting the impossibility of the lighting, thereby leading to a cost reduction.

On the other hand, if the light amount falls within the first range with respect to all the RGB color components, next, the calibration portion 82 determines whether the acquired light amount falls within a second range. The second range may be preset for each of the RGB color components. This second range is a range bounded based on a third threshold value TH3 (TH1<TH3) and a fourth threshold value TH4 (TH4<TH2), and the reference value is contained in the second range. Then, if the acquired light amount does not fall within the second range as a result of the determination, the calibration portion 82 conducts the calibration. The calibration at this time refers to processing of adjusting the light amount of the first light source 30*a* and/or the second light source 30*b* according to the detected light amount. More specifically, the calibration portion 82 adjusts the light amount of the corresponding light emitting elements 32*a* and/or 32*b* based on the result of the detection by the corresponding light receiving elements 41*a* and/or 41*b* for each color component and for each light emitting element group. Conducting the calibration by adjusting the light amount allows the variation in the light amount of the first light source 30*a* and/or the second light source 30*b* to be compensated for without amplifying noise.

In the present embodiment, the controller 80 adjusts the light amount of the light emitting elements 32*a* and/or 32*b* through PWM control. More specifically, the controller 80 is set to apply a voltage to the light emitting elements 32*a* and 32*b* at a duty ratio of 50% when the sorter 10 is shipped. Then, the calibration portion 82 compensates for the variation in the light amount of the light emitting elements 32a and/or 32b by increasing or reducing the duty ratio. More specifically, the calibration portion 82 reduces the duty ratio in such a manner that the light amount matches the reference value when the light amount of the light emitting elements 32a and/or 32b is greater than the reference value, and increases the duty ratio in such a manner that the light amount matches the reference value when the light amount of the light emitting elements 32a and/or 32b is smaller than the reference value. Setting the default duty ratio to lower than 100% allows the compensation to be available both when the light amount is greater than the reference value and when the light amount is smaller than the reference value. When failing to allow the light amount to reach the reference value even by changing the duty ratio, the controller 80 issues the notification via the notification portion 85.

On the other hand, if the acquired light amount falls within the second range, the calibration portion 82 determines not to conduct the calibration. In other words, when the variation in the light amount is small enough to make the calibration unnecessary, the controller 80 refrains from conducting the calibration. According to this configuration, the load on the controller 80 can be reduced.

According to the above-described processing by the controller 80, even when a variation occurs in the light amount of at least one of the first light source 30a and the second light source 30b during the sorting operation of the sorter 10, this variation can be compensated for in real time. In addition, the provision of the above-described intermediate members 50 allows the respective light amounts of the first light source 30a and the second light source 30b to be separately correctly detected, thereby increasing the accuracy of the calibration. Then, the calibration can be conducted in such a manner that the intensity of the signal acquired by the first optical sensor 40a and the signal acquired by the second optical sensor 40b fall within the same reference range. Therefore, the accuracy of the determination by the determination portion 81 is improved.

Further, according to the processing by the controller 80, the calibration is conducted if the degree of the variation in the light amount of each of the first light source 30a and the second light source 30b is such a degree that the determination accuracy can be appropriately ensured by the calibration, and the notification indicating the abnormality in the light amount is issued if the degree is such a degree that the determination accuracy cannot be appropriately ensured by the calibration. Therefore, a proper measure can be taken according to the degree of the variation in the light amount.

In an alternative embodiment, the calibration portion 82 conducts the calibration if the detected light amount falls within the first range. In other words, if the detected light amount is different from the reference value by an amount not requiring the notification of the abnormality in the light amount, the calibration is conducted even if this difference is extremely small. According to this configuration, the variation in the light amount of each of the first light source 30a and the first optical sensor 40a can be further strictly compensated for.

In a further alternative embodiment, the calibration portion 82 conducts the calibration by adjusting a gain with respect to the signal acquired by the light receiving elements 41a and/or 41b corresponding to the material field of view V2 instead of the configuration that adjusts the light amount of the light emitting elements 32a and/or 32b. More specifically, when the light amount of the light emitting elements 32a and/or 32b is greater than the reference value, the calibration portion 82 reduces the gain by an amount corresponding to the ratio thereof. When the light amount of the light emitting elements 32a and/or 32b is smaller than the reference value, the calibration portion 82 increases the gain by an amount corresponding to the ratio thereof. The calibration portion 82 changes the gain by changing the gain in the AC/DC converter in the present embodiment, but, in a case where the first optical sensor 40a and the second optical sensor 40b include an amplification circuit built therein, the gain of the amplification circuit may be changed. According to this configuration, the variation in the light amount of each of the first light source 30a and the second light source 30b can be compensated for regardless of the performance of adjusting the light amount of each of the first light source 30a and the second light source 30b.

In a further alternative embodiment, the calibration portion 82 conducts the calibration based on a combination of the configuration that adjusts the light amount of the light emitting elements 32a and/or 32b and the configuration that adjusts the gain. For example, the default duty ratio may be set to 100%. In this case, when the light amount of the light emitting elements 32a and/or 32b is greater than the reference value, the calibration portion 82 reduces the duty ratio in such a manner that the light amount matches the reference value. When the light amount of the light emitting elements 32a and/or 32b is smaller than the reference value, the calibration portion 82 increases the gain by an amount corresponding to the ratio thereof. According to this configuration, the light amount can be sufficiently secured when the light amount of the light emitting elements 32a and 32b falls within an appropriate range. Alternatively, the default duty ratio may be set to lower than 100% (for example, 90%), and, when the light amount does not reach the reference value even with the duty ratio increased to 100%, the gain may be adjusted regarding the insufficient light amount.

Figure 5:
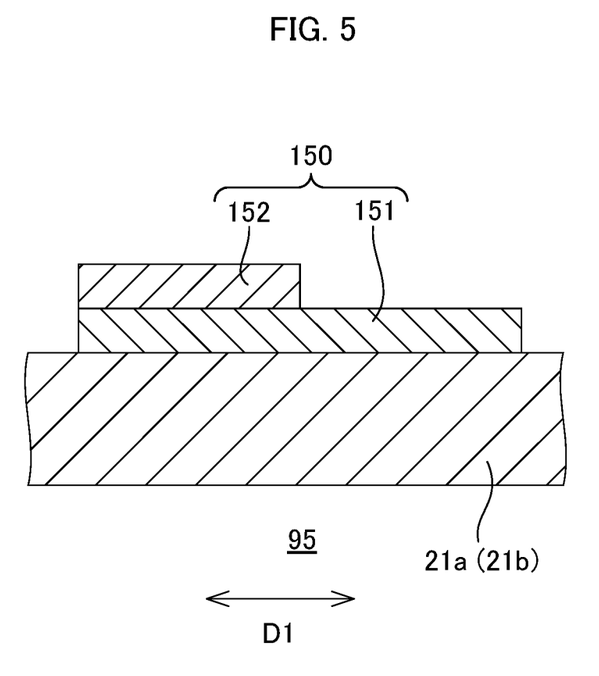
FIG. 5 is a cross-sectional view of an intermediate member according to an alternative embodiment.

FIG. 5 illustrates a cross-section of an intermediate member 150 according to an alternative embodiment. The intermediate member 150 includes a first layer 151 and a second layer 152. The first layer 151 and the second layer 152 are made from the same materials as the first layer 51 and the second layer 52 illustrated in FIG. 3, respectively. The intermediate member 150 is different from the intermediate member 50 only in terms of including a one-layered structure portion including only the first layer 151 and a two-layered structure portion including the first layer 151 and the second layer 152. The two-layered structure portion has a function similar to the intermediate member 50. The one-layered structure portion functions as a low-reflection region that substantially does not reflect light. The first optical sensor 40a includes the light receiving element 41a that detects reflected light on the two-layered structure portion and the light receiving element 41a that detects light in the low-reflection region but does not detect the above-described reflected light. The same also applies to the second optical sensor 40b. A result of the detection of the light in the low-reflection region can be used to make an offset correction or a gain correction of a result of the detection of the above-described reflected light. The low-reflection region may be, for example, a region where a total reflectance is 10% or lower.

The above-described calibration processing and notification processing can be performed at any timing. For example, these processing procedures may be performed before the operation of the sorter 10 is started instead of or in addition to during the sorting operation of the sorter 10. Further, in a case where the sorter 10 is configured to clean the transparent members 21a and 21b by a wiper and configured to temporarily interrupt the sorting processing to clean them, the calibration processing and the notification processing may be performed at the time of this cleaning.

Alternatively, the calibration portion 82 may conduct the calibration only during the sorting operation of the sorter 10. In this case, the controller 80 may reduce the light amounts of the first light source 30*a* and the second light source 30*b* while the sorting operation of the sorter 10 is stopped, compared to during the sorting operation (this processing will also be referred to as light amount reduction processing). The controller 80 may reduce the light amounts by reducing the values of electric currents supplied to the first light source 30*a* and the second light source 30*b*. According to the light amount reduction processing, the sorter 10 can excellently conduct the calibration while pursuing a reduction in power consumption and the prevention of the deterioration of the first light source 30*a* and the second light source 30*b*. In this case, the electric current value while the sorting operation is stopped may be 5 to 50% (for example, 10%) of the electric current value during the sorting operation.

According to a configuration in which the supply of the electric currents to the first light source 30*a* and the second light source 30*b* is not completely stopped while the sorting operation is stopped, the sorter 10 can reduce the time taken until the temperatures of the first light source 30*a* and the second light source 30*b* are converged and their brightness is stabilized when the sorting operation is restarted from the state in which the sorting operation is stopped. In other words, a warm-up state or a state close thereto can be maintained.

The light amount reduction processing is especially effective if being applied to the sorter 10 including an openable apparatus body cover for containing the optical detection unit 20. In this case, the light amount reduction processing contributes to preventing occurrence of such a phenomenon that, when a worker opens the apparatus body cover for maintenance work of the optical detection unit 20, the first light source 30*a* and the second light source 30*b* are too bright and hinder the work. In addition, the first light source 30*a* and the second light source 30*b* are not completely turned off, and therefore the optical detection unit 20 is adequately brightened up even when it is dark around the sorter 10. Therefore, the workability is improved.

Further, the light amount reduction processing may be performed in different manners between when the sorting operation is stopped and the apparatus body cover is opened (hereinafter referred to a first situation) and when the sorting operation is stopped and the apparatus body cover is closed (hereinafter referred to as a second situation). For example, the controller 80 may reduce the light amounts of the first light source 30*a* and the second light source 30*b* under the first situation compared to under the second situation. For example, the electric current value under the first situation may be 5% of the electric current value supplied during the sorting operation, and the electric current value under the second situation may be 10% of the electric current value supplied during the sorting operation. According to this configuration, the above-described advantageous effect regarding the warm-up can be enhanced under the second situation, and the above-described advantageous effect regarding the workability can be enhanced under the first situation. The opening/closing of the apparatus body cover may be mechanically, electrically, optically, or magnetically detected by any known type of sensor.

The above-described light amount reduction processing can be realized separately from the calibration processing. For example, the controller 80 may perform the light amount reduction processing when detecting, by the sensor, that the openable cover is opened.

Having described several embodiments of the present disclosure, the above-described embodiments are intended to only facilitate the understanding of the present teachings, and are not intended to limit the present invention thereto. The present invention can be modified or improved without departing from the spirit thereof, and the present invention includes equivalents thereof. Further, each of the elements described in the claims and the specification can be combined in any manner or omitted in any manner within a range that allows it to remain capable of achieving at least a part of the above-described objects or bringing about at least a part of the above-described advantageous effects.

For example, the first light source 30*a* and the second light source 30*b* may be formed by any type of light emitting element instead of the LED. The light emitting element may be, for example, a fluorescent light or an EL. Further, the sorter 10 may include a light source that emits near-infrared light instead of or in addition to the first light sources 30*a* and 30*b*. In this case, an additional intermediate member having a function equivalent to the intermediate member 50 may be provided for the near-infrared light source, and the calibration processing and the notification processing may be performed with respect to the near-infrared light source.

Further, the first layer 51 of the intermediate member 50 may be omitted. Alternatively, only one of the above-described calibration processing and notification processing may be performed. Alternatively, the connection configuration illustrated in FIG. 4 may be employed alone separately from the other various configurations. For example, the first light source 30*a* and the second light source 30*b* may include a plurality of light emitting element groups each of which includes a plurality of light emitting elements electrically connected in series. The controller 80 may determine whether the lighting impossible state has occurred based on the result of the detection by the light receiving elements 41*a* or the light receiving elements 41*b* corresponding to the material field of view V2. In this case, the light receiving elements 41*a* and the light receiving elements 41*b* corresponding to the non-material field of view V3 can also be omitted. Further, the controller 80 may issue the notification indicating the abnormality in the light amount when the detected light amount of the light receiving elements 41*a* or the light receiving elements 41*b* is equal to or smaller than a predetermined value.

Further, one of the first optical sensor 40*a* and the second optical sensor 40*b* may be omitted, or one of the first light source 30*a* and the second light source 30*b* may be omitted. According to such omission, the light associated with the sorting target 90 may be one of the reflected light and the transmitted light.

Further, the number of installed intermediate members 50 can be any number equal to or greater than one.

DESCRIPTION OF THE REFERENCE NUMERALS

10 optical sorter
20 optical detection unit
21*a*, 21*b* transparent member
30*a* first light source
30*b* second light source
31*a*, 31*b* light
32*a*, 32*b* light emitting element
40*a* first optical sensor 40b second optical sensor
41a, 41b light receiving element
50, 150 intermediate member
51, 151 first layer
52, 152 second layer
71 storage tank
72 feeder
73 chute
74 acceptable product discharge gutter
75 defective product discharge gutter
76 ejector
77 air
80 controller
81 determination portion
82 calibration portion
85 notification portion
90, 91, 92 sorting target
95 conveyance route
G1 first light emitting element group
G2 second light emitting element group
D1 direction in which the light receiving elements are arranged
V1 total field of view of the first optical sensor and the second optical sensor
V2 material field of view of the first optical sensor and the second optical sensor
V3 non-material field of view of the first optical sensor and the second optical sensor

What is claimed is:

1. An optical sorter comprising:
a light source configured to irradiate a sorting target in transit on a conveyance route with light;
an optical sensor configured to detect light emitted from the light source and associated with the sorting target;
a determination portion configured to determine whether the sorting target is a foreign object and/or a defective product based on a signal acquired by the optical sensor with respect to the light associated with the sorting target; and
at least one intermediate member disposed at a position located between the light source and the conveyance route in a direction in which the sorting target is irradiated with the light from the light source and located in such a manner that the intermediate member does not affect the detection of the light associated with the sorting target, the at least one intermediate member including a reflection region on which the light emitted from the light source is reflected,
wherein the optical sensor is further configured to detect the light emitted from the light source and reflected on the reflection region.

2. The optical sorter according to claim 1, wherein the light source includes:
a first light source disposed on a first side with respect to the conveyance route of the sorting target; and
a second light source disposed on a second side opposite from the first side,
the optical sensor includes at least one of a first optical sensor disposed on the first side and a second optical sensor disposed on the second side, and
the at least one intermediate member is optically non-transmissive, and substantially prevents the light from reaching the optical sensor by being transmitted through the at least one intermediate member from one side where the conveyance route is located.

3. The optical sorter according to claim 1, further comprising a transparent member separating the light source and the optical sensor, and the conveyance route,
wherein the at least one intermediate member is in the form of a sheet member adherable to the transparent member.

4. The optical sorter according to claim 3, wherein the at least one intermediate member is disposed opposite of the transparent member from the conveyance route.

5. The optical sorter according to claim 1, wherein the optical sensor is a line sensor or an area sensor including a plurality of linearly arranged light receiving elements, and
the at least one intermediate member is disposed on both sides of the conveyance route in an arrangement direction that is a direction in which the plurality of light receiving elements is arranged.

6. The optical sorter according to claim 1, further comprising a calibration portion configured to conduct calibration based on a result of the detection by the optical sensor with respect to the light reflected on the reflection region.

7. The optical sorter according to claim 6, wherein the calibration includes adjusting a light amount of the light source based on the result of the detection.

8. The optical sorter according to claim 6, wherein the calibration includes adjusting, based on the result of the detection, a gain regarding the signal acquired by the optical sensor.

9. The optical sorter according to claim 1, further comprising a notification portion configured to issue a notification indicating an abnormality in a case where the light amount of the light source is determined, based on the result of the detection by the optical sensor with respect to the light reflected on the reflection region, not to fall within a first range bounded based on a first threshold value and a second threshold value greater than the first threshold value.

10. The optical sorter according to claim 9, further comprising a calibration portion configured to conduct calibration based on a result of the detection by the optical sensor with respect to the light reflected on the reflection region,
wherein the calibration portion is further configured to conduct the calibration in a case where the light amount of the light source is determined, based on the result of the detection, to fall within the first range but not to fall within a second range bounded based on a third threshold value greater than the first threshold value and a fourth threshold value greater than the third threshold value and smaller than the second threshold value.

11. The optical sorter according to claim 1, wherein the light source includes a plurality of light emitting element groups each of which includes a plurality of light emitting elements electrically connected in series.

12. The optical sorter according to claim 11, wherein the optical sensor is a line sensor or an area sensor including a plurality of linearly arranged light receiving elements,
the at least one intermediate member is disposed on both sides of the conveyance route in an arrangement direction that is a direction in which the plurality of light receiving elements is arranged, and
the plurality of light emitting element groups consists of a first light emitting element group and a second light emitting element group, and
the first light emitting element group is disposed on one side in the arrangement direction, and the second light emitting element group is disposed on an opposite side in the arrangement direction.

* * * * *